Dec. 20, 1932. W. VINTEN 1,891,585
CINEMATOGRAPHIC FILM FEED MECHANISM
Filed April 26, 1932 5 Sheets-Sheet 1

INVENTOR
William Vinten
BY
Wilkinson & Mawhinney
ATTORNEYS.

INVENTOR
William Vinten
BY
Wilkinson & Mawhinney
ATTORNEYS.

Dec. 20, 1932.                W. VINTEN                1,891,585
CINEMATOGRAPHIC FILM FEED MECHANISM
Filed April 26, 1932        5 Sheets-Sheet 3
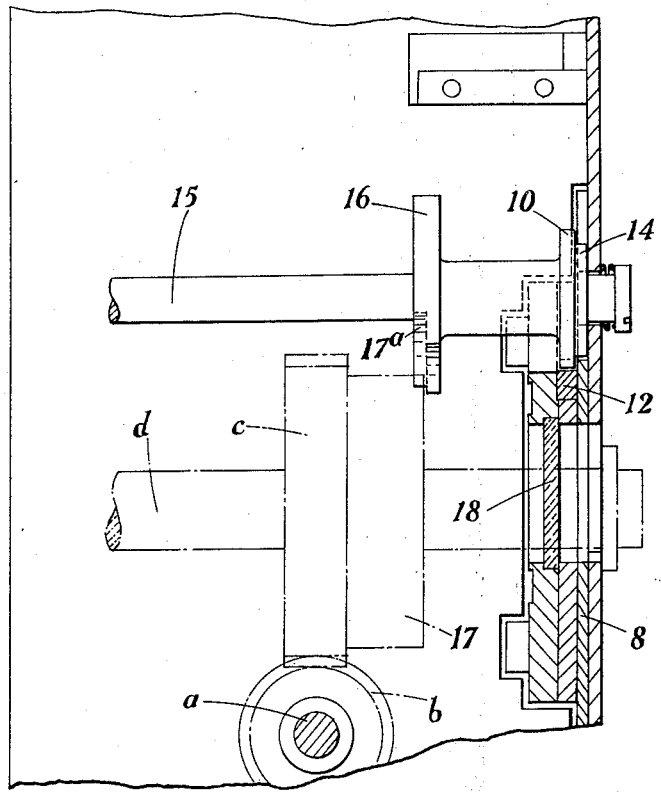
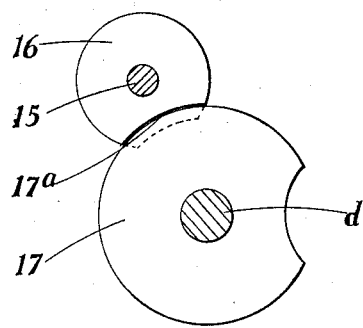
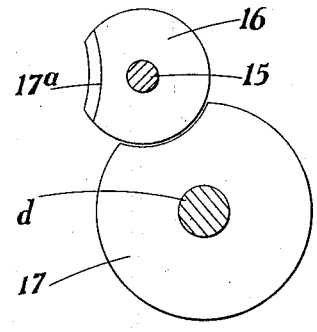
INVENTOR
William Vinten
BY
Wilkinson & Mawhinney
ATTORNEYS.

Dec. 20, 1932.                W. VINTEN                1,891,585
                CINEMATOGRAPHIC FILM FEED MECHANISM
                Filed April 26, 1932        5 Sheets-Sheet 4
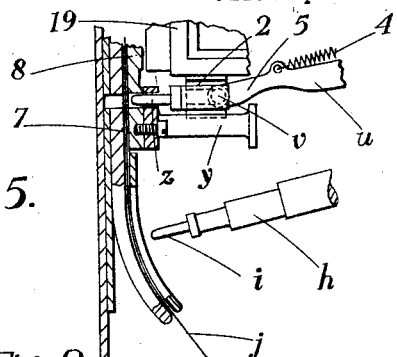
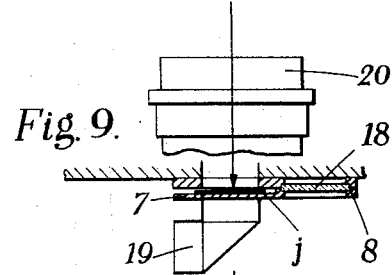
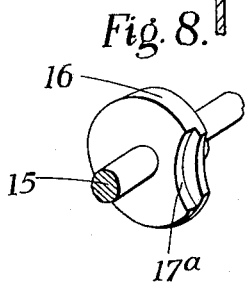
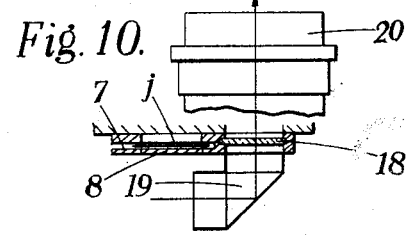
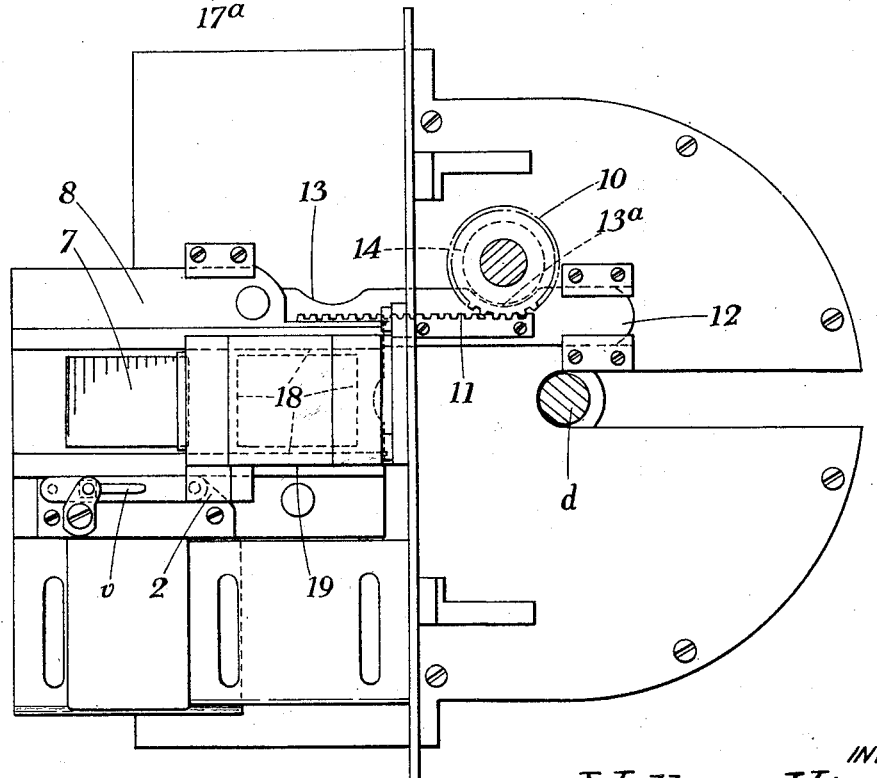
INVENTOR
William Vinten
BY
Wilkinson & Mawhinney
ATTORNEYS.

Dec. 20, 1932.  W. VINTEN  1,891,585
CINEMATOGRAPHIC FILM FEED MECHANISM
Filed April 26, 1932   5 Sheets-Sheet 5

INVENTOR
William Vinten
BY
Wilkinson & Mawhinney
ATTORNEYS.

Patented Dec. 20, 1932

1,891,585

UNITED STATES PATENT OFFICE

WILLIAM VINTEN, OF LONDON, ENGLAND

CINEMATOGRAPHIC FILM FEED MECHANISM

Application filed April 26, 1932, Serial No. 607,641, and in Great Britain May 18, 1931.

It is well known that in the production of cinematographic pictures combined with records for the reproduction of sound it is important to avoid noise which would interfere with the true reproduction of the required sounds and to overcome or absorb the sounds emitted from the mechanism used for the film feed, the camera has been isolated or walled in by an insulated structure so as to avoid these detrimental effects.

The chief object of the present invention is to provide mechanism in connection with the well known claw movement whereby a pair of pins engage with the standard holes or perforations in the film to feed the film forward whilst another pair of pins are projected at the end of the feed which are known as register-pins to secure the film in its correct position whilst the camera or other apparatus is manipulated.

With this known apparatus cams and other gear have hitherto been employed for effecting this compound motion or manipulation of the separate pairs of feed and register pins whereby considerable noise is caused which is detrimental to the production of "talking" pictures.

With the arrangement of mechanism constructed in accordance with the present invention only one crank pin is employed for procuring the necessary and correct timing of the movements of both the feeding and the registering pins and due to this fact the noise caused by the gearing or the running of rollers over cam surfaces is entirely obviated so that the feed mechanism is practically silent in running and the need for housing the camera in an insulated structure to avoid the detrimental effects of sounds produced by the film feed mechanism can be dispensed with.

Incidentally, by the mechanism hereinafter described provision can be made for that part of the feed mechanism employed for operating the register pins to be freed from the other part of the apparatus so that the film may be moved transversely away from the exposure position to enable a focusing glass to be brought into that position for correctly focusing the lens on to the scene to be taken, such a manipulation of the film being effected by a knob or other similar contrivance placed outside the case containing the mechanism and when this condition exists the film feed mechanism of the camera is locked and rendered inoperative.

In order that the invention may be clearly understood reference will now be made to the accompanying five sheets of drawings in the following detailed description of the mechanism wherein similar reference characters relate to like parts in the several figures thereof and in which:—

Figure 3 is a sectional elevation taken on line 3—3 of Figure 2 to an enlarged scale.

Figure 4 is a fragmentary elevation of the means for effecting the transverse movement aforesaid.

Figure 5 is a fragmentary elevation showing the respective positions of the register and feed pins when it is desired to insert the film whilst Figures 6, 7 and 8 illustrate details of the means employed for rendering the film feed mechanism inoperative or permitting its operation according to circumstances and Figures 9 and 10 show the disposition of the parts for effecting the feed of the film and the use of the focussing glass respectively.

Figure 11:
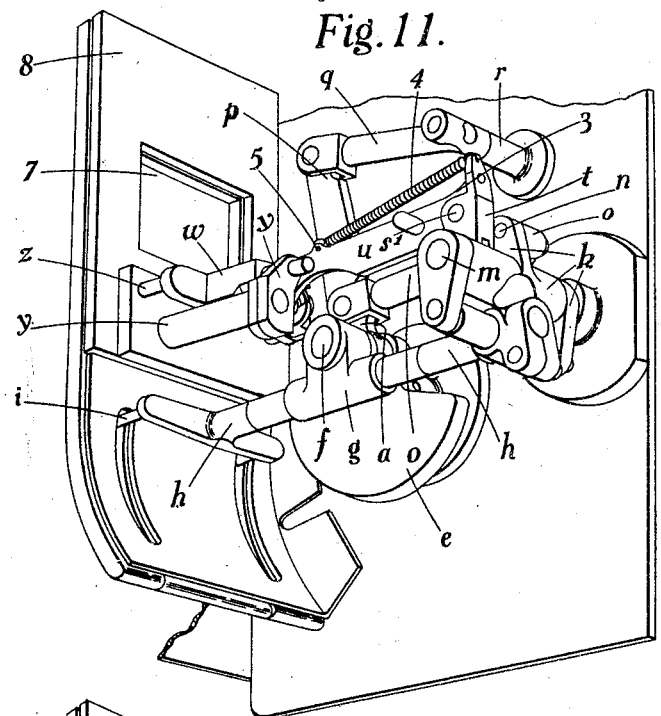
Figure 12:
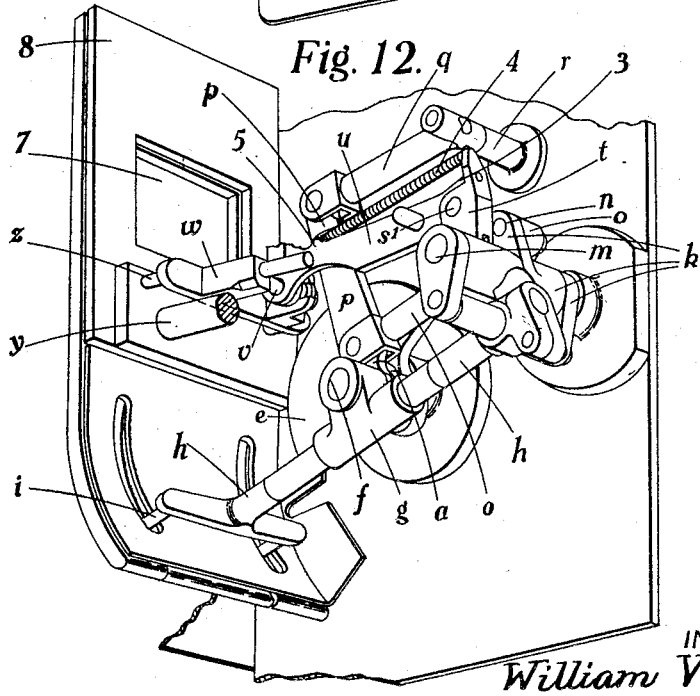

Figures 11 and 12 are perspective views to elucidate the assemblage of the film feed mechanism the former showing the relative positions of the parts at the commencement of the feed or when the feed pins just engage with the film whilst the latter show the positions of the parts at the end of the stroke or just when the feed pins leave or are disengaged from the film.

Referring now to the drawings the feed mechanism constructed in accordance with the present invention comprises a spindle $a$ running in suitable bearings to the end of which is attached the skew pinion $b$ which meshes with the skew wheel $c$ mounted on the main driving shaft $d$ or any other suitable means may be employed therefor, by which rotatory motion is imparted thereto.

At the opposite or interior end of the spindle $a$ is provided a balanced crank disc $e$, upon the crank pin $f$ of which depends a bracket $g$ within which the rod $h$ carrying the feed pins $i$ reciprocates; the feed pins $i$ travelling in an upward and downward or arcuate direction to effect the feed of the film $j$ in the ordinary way.

The rear end of the rod $h$ carrying the feed pins $i$ is connected to an oscillatory beam $k$ mounted on a fixed axis $m$. The upper end of this beam $k$ carries a stud or pin $n$ which forms the axis of a connecting rod $o$ the other end of which is associated with a vertically disposed arm $p$ mounted on the crank pin $f$, the upper end of the arm $p$ being pivotally attached to the end of an oscillatory lever $q$ mounted in a suitable fixed bearing $r$.

Adjacent to the connecting rod $o$ and on the pin or axis $s$ carried by the oscillatory beam $k$ is a link $t$ to the opposite end of which upon the pin $s'$ is attached a connecting rod $u$ which is coupled to a crosshead pin $v$ mounted on a crosshead $w$ that travels on suitable guides in a bracket $y$, the crosshead $w$ carrying the register pins $z$.

It will now be understood that by the rotation of the spindle $a$ and consequently the crank disc $e$ the feed pins $i$ will be brought into engagement with the film $j$ to be fed forward and by less than a half revolution of the disc $e$ the prescribed amount of film will be fed forward whilst immediately before the feed pins $i$ are withdrawn from the film the register pins $z$ engage with the perforations in the film $j$ immediately above the next portion to be fed forward and by the arrangement of levers, links and connecting rods described all gearing is dispensed with and nothing but rotatable axes are utilized so that all noises are thus eliminated and by the assemblage described and illustrated provision as to adjustment is made.

Figure 1:
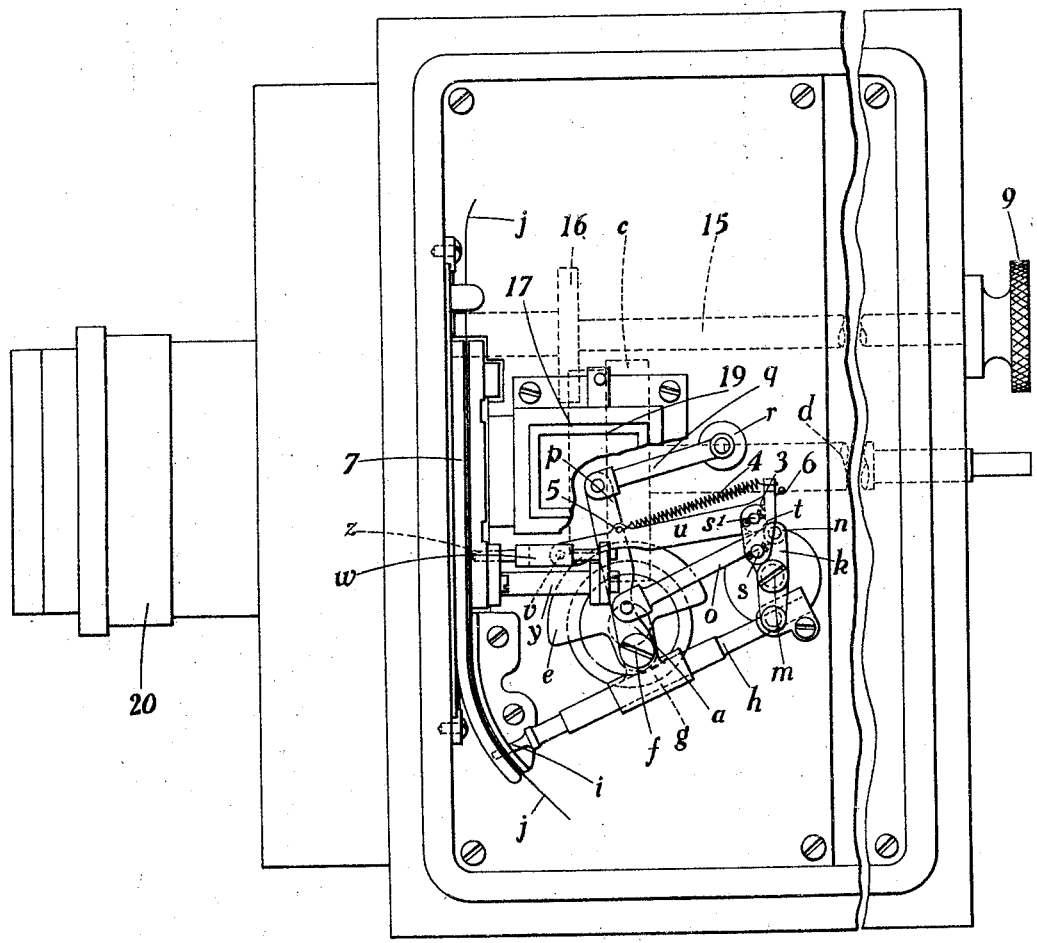
Figure 1 is a sectional elevation of the film feed mechanism fixed within a cinematographic camera.
Figure 2:
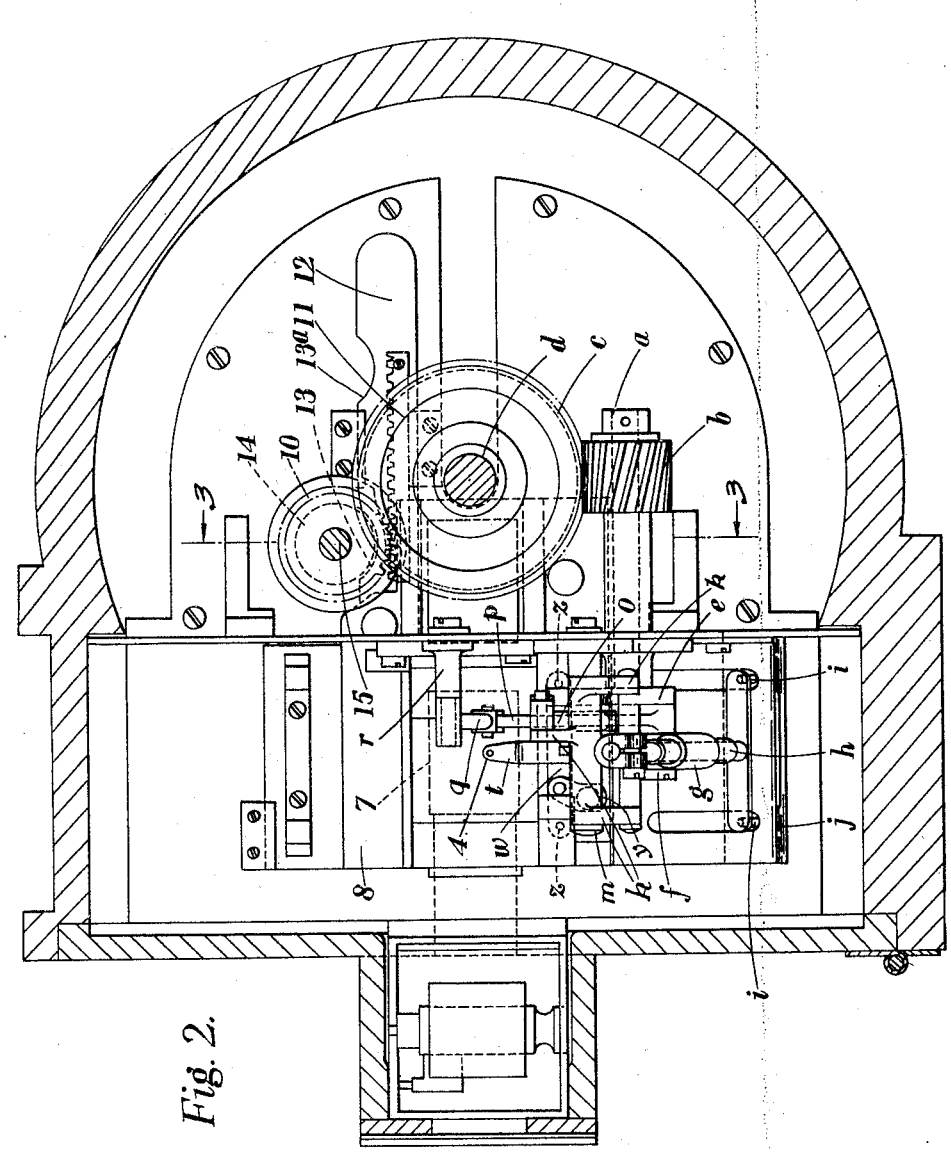
Figure 2 is a sectional elevation of the film feed mechanism as viewed from the right hand of Figure 1 showing the means for the transverse movement of the film in order to utilize the focussing glass.

For the purpose of removing the film $j$ laterally from the exposure position shown in Figure 2 the connecting rod $u$ associated with the crosshead pin $v$ carrying the register pins $z$ is provided with a T-slotted bush that runs loosely in a fixed T-slot guide 2 and the pin $v$ on the crosshead enters or leaves the hole in this T-slotted bush as and when the gate with its film is moved laterally.

The other end of the connecting rod $u$ where it couples to the beam $k$ associated with the feed pins $i$ has an upstanding projection 3 which with the short link $t$ forms an abutment and couples it to the beam $k$ associated with the feed pins $i$. These two abutments are retained in contact by means of the helical spring 4 attached to the upstanding short link $t$ and the projection 5 on the connecting rod $u$ near its other end.

By depressing the small knob 6 attached to the short upstanding link $t$ the abutting faces are separated and the register pins $z$ are withdrawn from the film thus providing simple means for the withdrawal or insertion of the film $j$ from or into the gate 7.

It will be observed that the last-mentioned detail in connection with the register pins $z$ not only provides means for associating the operation of the said register pins $z$ with the mechanism that operates the feed pins $i$ but owing to the same being mounted on the plate 8 can be moved transversely therewith ensuring at the same time the retention of the film $j$ in its correct position by the constant engagement of the register pins $z$ during movement for focussing purposes and the return for taking the picture.

As already stated the transverse movement of the film $j$ together with the register pins $z$ may be effected by withdrawing and rotating the knurled knob 9 on the exterior of the casing, by the rotation of which a spur wheel 10 operates the toothed rack 11 that is fixed to the bar 12 which is an extension of the plate 8.

The upper edge of this bar is provided with two curved indents 13 and 13$a$ that serve to determine the correct limit of travel in both directions by the engagement therewith of the spring urged disc 14 attached to the operating spindle 15. On this spindle 15 is fixed a disc 16 which has a clearance cut 17$a$ in it to clear disc 17 which is attached to the skew gear wheel $c$ that drives the crank shaft $a$. This clearance condition only exists when the film $j$ is in the taking position as shown in Figures 2 and 6 and effects the locking of the driving gear when the disc 14 is in the other indent 13$a$ as shown in Figures 4 and 7.

18 is a glazed aperture in the slidable plate 8 for use in connection with the ordinary prismatic view finder 19 and 20 is the lens mount.

Alternatively the feed mechanism as above described may be mounted on a plate that could be slid transversely on suitable pillars or spindles within the casing for the same purpose.

What I claim is:—

1. Transmission gear for driving cinematographic film feed mechanism of the claw and register pin type comprising in combination a driven rotating balanced disc carrying a crank pin from which depends a tubular bracket within which reciprocates a rod the forward end of which carries the feed pins whilst the rear end is attached to an oscillatory beam mounted about a fixed axis, whereby an arcuate motion is imparted to said feed pins which are projected and withdrawn to engage and disengage the film, the upper part of said beam supporting one end of a connecting rod the opposite end of which is attached to a vertically disposed arm mounted on the crank pin aforesaid the upper end of said arm carrying a connecting rod the opposite end of which is supported on a fixed axis so as to secure the up and down movement of said arm and the arcuate movement thereof, said oscillatory beam also supporting a link that abuts against the end of a horizontally disposed connecting rod that is coupled to a crosshead pin said crosshead being supported in guides in a fixed bracket so that an intermittent horizontal reciprocatory motion is imparted to said crosshead and the register pins carried thereby.

2. In transmission gear for driving cinematographic film feed mechanism of the claw and register pin type as claimed in claim 1, the said connecting rod by which the registering pins are operated consisting of two parts held together by a spring which parts are separable against the resistance of the spring to facilitate the insertion of the film into the gate.

3. In transmission gear for driving cinematographic film feed mechanism of the claw and register pin type as claimed in claim 1 means for disengaging the crosshead carrying the register pins from the connecting rod by which a reciprocatory motion is imparted thereto in order to retain the film in correct position whilst the same is moved transversely for focussing purposes.

4. In combination with transmission gear for driving cinematographic film feed mechanism of the claw and register pin type as claimed in claim 1, means for effecting the transverse movement of the film to permit of a focussing screen being placed in the position normally occupied by the film for critically setting the scene to be shot and means for automatically rendering the film feed mechanism inoperative until said film is returned to the normal taking position.

In testimony whereof I affix my signature.

WILLIAM VINTEN.